March 6, 1934.   R. J. NORTON   1,950,262
BRAKE SHOE STRUCTURE
Filed Nov. 13, 1930
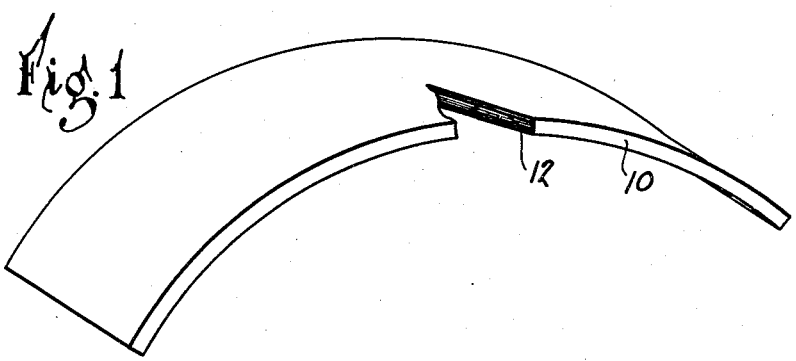
INVENTOR.
Raymond J. Norton
BY McConkey & Smith
ATTORNEYS.

Patented Mar. 6, 1934

1,950,262

UNITED STATES PATENT OFFICE 1,950,262

BRAKE SHOE STRUCTURE

Raymond J. Norton, Washington, D. C., assignor to Bendix Brake Company, South Bend, Ind., a corporation of Illinois Application November 13, 1930, Serial No. 495,532

3 Claims. (Cl. 154—52)

This invention relates to friction facings, particularly those of the type described in my co-pending application, Serial No. 361,013.

The usual type of brake comprises either an internal expanding shoe or an external contracting strap to which is attached a friction facing. Since the advent and high development of the servo and duo servo types of brake, the coefficient of friction of the friction facing has become of paramount importance. Due to the accelerated response and larger power multiplications of such types of brakes, it has become desirable to choose friction material having a relatively low coefficient of friction.

The purpose of the present invention is to provide a friction material which is adapted to be attached or molded to the shoe, and which will present a surface having the desirable hardening properties and in addition a relatively low coefficient of friction.

The invention broadly comprehends the idea of utilizing the present materials, that is to say, the materials now usually employed, and by a suitable treatment to reduce the coefficient of friction below that which would normally obtain.

For purposes of illustrating the invention in the drawing Figure 1 is a perspective showing of a section of lining having a section cut therefrom; and Figure 2 is an enlargement of a portion of the section of Figure 1.

More specifically the invention includes the provision of a friction material having a low coefficient of friction which is preferably made up by providing a permanently lubricated facing. This may be done by treating suitable fibrous material, such as asbestos, cellulose products, etc., with a suitable lubricant, and with the components of a synthetic resin. Upon reaction of the components of the resin, in the manner well known to those skilled in the art, an infusible substance may be produced which comprises a synthetic resin with which is permanently incorporated a predetermined amount of a lubricant.

As shown in the drawing, the lining 10 may be formed of a plurality of layers of fibrous material 12 specially treated in accordance with the process or processes hereinafter set forth in detail.

The operation may be carried out by treating relatively thin sheets of the fibrous material and then building up a number of these to form an integral laminated structure.

The friction material of the present invention may be made up similarly to the manner described in copending application Serial No. 324,361, filed December 7, 1928, of which the present application is a continuation in part.

As pointed out in that application, the preferred resin which is employed is a condensation product of furfural and phenol. This material is chosen because of its high reactivity, and particularly the ease with which it may be molded in a metal matrix.

In carrying out the invention, asbestos or other fibrous products of low or negligible flammability may be treated by mixing the loose fibers with a powder comprising a solid, non-oleaginous lubricant, such, for example, as graphite, soapstone, talc, or a combination of such materials. From these fibrous products treated with the powdered lubricant, a felted or woven strip of filler material is made up. If desired, such a strip may be made up from felted or woven asbestos alone, in which case the powdered lubricant is added to the strip later, either in a dry powdered form, or carried by a suitable liquid vehicle that is subsequently evaporated or otherwise removed.

After the initial treatment of the filler material with the lubricating substance, it may then be treated with a solution of a fusible resin in a suitable vehicle or solvent. This solution also contains a hardener. As is known, upon the application of sufficient heat and pressure to these potentially reactive substances, a further reaction ensues with the formation of an infusible product.

The fusible form of the resin may first be made up by reacting the proper amounts of furfural and phenol in the presence of a suitable catalyst, such as hydrochloric acid. As in the usual case of making up a fusible form of the resin, the amount of furfural formaldehyde, or equivalent substance which is employed, is insufficient to form the infusible resin. These substances are then allowed to react under the proper thermal conditions. After the formation of the fusible form of the resin, the water may be removed and the mass distilled with steam to remove the excess of phenol.

This fusible gum or resin may then be dissolved in a suitable solvent, such as alcohol, acetone, etc. To this solution of the resin there may then be added a suitable quantity of a hardening agent, which will react with the fusible form of the resin to form the infusible product. When furfural is employed the hardening agent may be an additional amount of furfural and ammonia, or furfuramid. In place of the furfural, or its derivative, other hardeners, such as hexamethylenetetramin, paraform, etc., may be used.

While a furfural condensation product is given as a typical and preferred form of invention, it is to be understood that this is merely an example of any form of infusible synthetic resin. Instead of a furfural condensation product, there may be employed the phenol formaldehyde condensation or the acetylene condensation product.

The potentially reactive composition which comprises a solution of the fusible gum, with which is associated a suitable hardener, is then used as an impregnant for the pretreated fibrous filling material. The impregnation of the fiber may be carried out under any of the well known accelerating conditions. After the desired impregnation of the fiber has been accomplished, the material may then be placed in a mold and heated to initiate and accelerate the final reaction, with the resultant formation of the hard set infusible resin. It will be understood that the quantity of hardening agent employed, and the temperature and pressure conditions of the treatment may be varied, depending upon the degree of infusibility and hardness which is desired.

It will be understood that the material comprising a fibrous filler, a solid, comminuted and non-oleaginous lubricant, and a dispersed condensation product may be molded directly on the brake shoe, as pointed out in the copending application Serial No. 324,362, filed December 7, 1928. Also, if desired, the facing may be made up as a separate element, and then attached to the shoe by any suitable means.

After the described treatment, the resultant product comprises a permanently lubricated resin. As already indicated, this may be made up in the form of relatively thin strips. If such is the case, these may be built up to the desired thickness and then treated with additional quantities of the potentially reactive infusible form of the resin.

Upon the application of heat and pressure, the separate laminæ may be permanently bonded together. Also, if desired, the material may be made up initially of the desired thickness by impregnating superimposed layers of the fiber with the synthetic gum in the plastic form. These several layers may then be subjected to heat and pressure in a mold to cause complete reaction and the formation of the infusible product.

Other methods of combining the materials may be followed within the purview of my invention. Thus the powdered or comminuted lubricant may be mixed with the fusible resin and such mixture applied to felted or woven strips of fibrous material and the resin subsequently converted to an infusible form as above described. Or, woven or felted strips of asbestos may be treated with a fusible resin, then dusted with the powdered lubricant, and the resin finally converted into an infusible form. If desired, the loose fibrous materials may be mixed with the powdered lubricant and fusible resin to compose a material that may be molded or cast into desired shapes and later treated to convert the resin into an infusible form.

While there are described several specific embodiments of the invention, it is to be understood that these are given merely by way of example for, as pointed out, the particular methods disclosed may be greatly modified, within the scope of the principles involved. Hence, it is not intended that the invention shall be limited to the descriptive matter set forth in the specificaion, except as such limitations are clearly imposed by the appended claims.

I claim:

1. A friction facing comprising a plurality of thin sheets of a fibrous material each treated with a non-oleaginous lubricant and bonded with a resinoid.

2. A friction facing comprising a plurality of thin sheets of a fibrous material each treated with a powdered lubricant to homogeneously disperse the lubricant through the sheets and permanently bonded with an infusible synthetic resin.

3. A friction facing comprising thin sheets of a fibrous substance, each sheet having permanently incorporated therewith a predetermined amount of a non-oleaginous lubricant, the lubricant treated sheets then being permanently bonded together with an infusible synthetic resin.

RAYMOND J. NORTON.